United States Patent Office 3,707,365
Patented Dec. 26, 1972

3,707,365
SYNERGISTIC HERBICIDE COMBINATION OF CYCLOHEXENONE DIMERS WITH HERBICIDES
Harold A. Kaufman, Piscataway, and Roger P. Napier, Somerville, N.J., assignors to Mobil Oil Corporation
No Drawing. Continuation-in-part of application Ser. No. 819,109, Apr. 24, 1969. This application Mar. 31, 1970, Ser. No. 24,326
Int. Cl. A01n 9/22
U.S. Cl. 71—93                    2 Claims

ABSTRACT OF THE DISCLOSURE

The dimer of 2-cyclohexen-1-one and its substituted derivatives are synergists that enhance the activity of herbicides, such as 2,4,5 - trichlorophenoxybenzoic acid (2,4,5–T), 2,4–D, and triazines (Atrazine).

CROSS-REFERENCE TO RELATED APPLICATIONS

This application is a continuation-in-part of copending application Ser. No. 819,109, filed Apr. 24, 1969, now abandoned.

BACKGROUND OF THE INVENTION

Field of the invention

This invention is concerned with synergistic herbicidal combinations.

DESCRIPTION OF THE PRIOR ART 2-cyclohexen-1-one has been known to dimerize under basic conditions to produce 2-(3'-oxocyclohexyl)-2-cyclohexen-1-one [J. Org. Chem., 31, 639 to 645 (1966)]. Insofar as is now known, the dimer has not been known to have synergistic herbicidal properties.

SUMMARY OF THE INVENTION

This invention provides a synergistic herbicidal combination comprising a compound having the formula:

<chemical structure> wherein R and R' are the same or different, and can be hydrogen, alkyl ($C_1$–$C_3$), aryl, substituted aryl, alkoxy ($C_1$–$C_3$), alkylthio ($C_1$–$C_3$), oxo, alkoxycarbonyl ($C_1$–$C_3$), or carboxy and a herbicide.

DESCRIPTION OF THE SPECIFIC EMBODIMENTS

The synergists used in the combinations of this invention are the dimers of 2-cyclohexen-1-one, or substituted derivatives, having the structure aforedefined. Non-limiting examples of the synergist are 2-(3'-oxocyclohexyl)-2 - cyclohexen - 1-one; 2-(3'-oxocyclohexyl)-3-hydroxy-2-cyclohexen-1-one; and 2-(1'-methyl-3'-oxocyclohexyl)-3-methyl-2-cyclohexen-1-one.

EXAMPLE 1

2-cyclohexen-1-one (20 g.) was mixed with 5 ml. of a 0.5% KOH in methanol solution. An exotherm occurred. The reaction mixture was cooled and distilled. A fraction boiling at 170° C. at 9.6 mm. Hg pressure was collected in 58% yield. The product was identified by NMR data to be 2-(3'-oxocyclohexyl)-2-cyclohexen-1-one.

The phenoxy compound herbicides that have their activity enhanced in accordance with this invention include 2,4-dichlorophenoxyacetic acid (2,4–D); 2,4,5-trichlorophenoxyacetic acid (2,4,5–T); 2-methyl-4-chlorophenoxyacetic acid (MCP); 2-(2,4,5-trichlorophenoxy)propionic acid; p-chlorophenoxyacetic acid; 2,5-dichlorophenoxyacetic acid; 3,4-dichlorophenoxyacetic acid (3,4–D): the esters and sodium, ammonium, and amine salts of these acids; and sodium 2-(2,4-dichlorophenoxy)ethyl sulfate.

Triazine type herbicides that have their activity enhanced in accordance with this invention include 2-chloro-4-ethylamino-6-isopropylamino-s-triazine (Atrazine); 2-chloro - 4,6 - bis(ethylamino) - s-triazine (Simazin); 2-chloro - 4,6 - bis(diisopropylamino) - s - triazine (Propazine); and 2-methoxy-4-ethylamino-6-isopropylamino-s-triazine (Atratone).

It is anticipitated that the herbicidal behavior of the following classes of hercibical compounds will be enhanced by the use of the 2-cyclohexen-1-one dimer synergists: phenyl ethers, benzoic and acetic acids, phthalic compounds, dinitrophenols and derivatives, toluidines and nitriles, amides and anilides, carbamates, triazines, pyridines, pyridazones, picolinic acids, urea compounds, phosphites, and phosphates.

The weight ratio of synergist to herbicide used in accordance with this invention is between about 0.1 and about 8. The amount of herbicide applied is between about ¼ pound and about 8 pounds per acre.

The synergist combinations of this invention can be applied in various ways to achieve herbicidal action. They can be applied, per se, as solids or in vaporized form, but are preferably applied as the toxic components in pesticidal compositions of the compounds and a carrier. The compositions can be applied, as dusts, as liquid sprays, or as gas-propelled sprays, and can contain, in addition to a carrier, additives such as emulsifying agents, binding agents, gases compressed to the liquid state, odorants, stabilizer, and the like. A wide variety of liquid and solid carriers, include talc, bentonite, diatomaceous earth, pyrophyllite, fullers earth, gypsum, flours derived from cottonseeds and nut shells, and various natural and synthetic clays having a pH not exceeding about 9.5. Non-limiting examples of liquid carriers, include water; organic solvents, such as alcohols, ketones, amides, and esters; mineral oils, such as kerosene, light oils, medium oils, and vegetable oil, such as cottonseed oil.

EXAMPLE 2

2 - (3' - oxocyclohexyl)-2-cyclohexen-1-one (coded as MC-2471) and 2,4,5-trichlorophenoxyacetic acid (2,4,5–T) were tested alone and in combination for late season's control of Japanese honeysuckle. The test plots were 10' x 10' natural stands of Japanese honeysuckle that had initiated seasonal decline. All spray solutions were prepared with formulated material which was diluted with water in the spray immediately before spraying each plot. The required amount of active ingredient was delivered at a rate of 100 gallons per acre. Application was made with a B & G stainless steel sprayer equipped with a flat spray nozzle tip. Pressure was supplied from a compressed nitrogen cylinder. Pertinent data and results are set forth in Table I.

TABLE I

| Treatment | Lbs./acre | Percent kill |
|---|---|---|
| MC-2471 | 2 | 10 |
| 2,4,5-T | 1 | 65 |
| 2,4,5-T | 2 | 98 |
| MC-2471 plus 2,4,5-T | 1+1 | 95 |
| Untreated | | 15 |

EXAMPLE 3

2 - (3' - oxocyclohexyl)-2-cyclohexen-1-one (coded as MC-2471) and 2-chloro-4-ethylamino-6-isopropylaminos-triazine (Atrazine) were tested alone and in combination for control of lamb's-quarters. The test plots were 10' x 10' natural stands of lamb's-quarters. Using the techniques described in Example 2, test plots were sprayed with the required amount of active ingredient delivered at a rate of 100 gallons per acre. Pertinent data and results are set forth in Table II.

TABLE II

| Treatment | Lbs./acre | Percent kill |
|---|---|---|
| MC-2471 | 2 | 0 |
| Atrazine | 0.5 | 60 |
| Atrazine plus MC-2471 | 0.5+2 | 100 |
| Atrazine | 0.25 | 20 |
| Atrazine plus MC-2471 | 0.25+2 | 90 |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. An herbicidal composition consisting essentially of an effective amount of 2,4,5-trichlorophenoxyacetic acid herbicide and 2-(3'-oxocyclohexyl)-2-cyclohexen-1-one synergist; the weight ratio of said synergist to said herbicide being about 1:1, and the amount of said herbicide applied being between about 0.25 pound and about 8 pounds per acre.

2. An herbicidal composition consisting essentially of an effective amount of 2-chloro-4-ethylamino-6-isopropylamino-s-triazine herbicide and 2-(3'-oxocyclohexyl)-2-cyclohexen-1-one synergist; the weight ratio of said synergist to said herbicide being between about 4:1 and about 8:1, and the amount of said herbicide applied being between about 0.25 pound and about 8 pounds per acre.

References Cited

Thomson: "Agricultural Chemicals II—Herbicides" (1964) pp. 4, 5 and 114.

LEWIS GOTTS, Primary Examiner

C. L. MILLS, Assistant Examiner

U.S. Cl. X.R.

71—79, 108, 109, 110, 116, 117, 123